United States Patent [19]

Stowe, Jr.

[11] Patent Number: 5,403,568
[45] Date of Patent: Apr. 4, 1995

[54] HORIZONTAL WET SCRUBBING APPARATUS AND METHOD FOR REMOVING SULFUR DIOXIDE FROM A GASEOUS STREAM

[75] Inventor: Donald H. Stowe, Jr., Beaver, Pa.

[73] Assignee: Dravo Lime Company, Pittsburgh, Pa.

[21] Appl. No.: 27,203

[22] Filed: Mar. 5, 1993

[51] Int. Cl.⁶ .............................................. C01B 17/00
[52] U.S. Cl. ............................... 423/243.08; 423/243.09
[58] Field of Search ..................... 423/243.08, 243.09, 423/243.01

[56] References Cited

U.S. PATENT DOCUMENTS

| | | | |
|---|---|---|---|
| 1,908,782 | 5/1933 | Pearce | 423/243.01 |
| 1,985,010 | 12/1934 | Berkhuijsen | 261/115 |
| 2,215,707 | 9/1940 | Matanovich-Manov | 261/18 |
| 3,119,675 | 1/1964 | Gallagher | 55/257 |
| 3,522,000 | 7/1970 | Kinney | 23/2 |
| 3,617,212 | 11/1971 | Shah | 423/243.09 |
| 3,653,823 | 4/1972 | Shah | 423/243.09 |
| 3,763,634 | 10/1973 | Alliger | 55/223 |
| 3,948,608 | 4/1976 | Weir, Jr. | 23/284 |
| 3,969,482 | 7/1976 | Teller | 423/243.07 |
| 3,985,860 | 10/1976 | Mandelik et al. | 423/242 |
| 4,049,399 | 9/1977 | Teller | 55/73 |
| 4,060,587 | 11/1977 | Lewis | 423/210 |
| 4,102,982 | 7/1978 | Weir, Jr. | 423/242 |
| 4,158,702 | 6/1979 | Archer | 423/210 |
| 4,269,812 | 5/1981 | Edwards et al. | 423/242 |
| 4,369,167 | 1/1983 | Weir, Jr. | 423/210 |
| 4,374,813 | 2/1983 | Chen et al. | 423/243.01 |
| 4,888,158 | 12/1989 | Downs | 423/242 |
| 4,963,329 | 10/1990 | Burgess et al. | 422/168 |
| 5,192,517 | 3/1993 | Spink | 423/243.08 |

Primary Examiner—Gary P. Straub
Attorney, Agent, or Firm—Armstrong, Westerman, Hattori, McLeland & Naughton

[57] ABSTRACT

A horizontal wet scrubbing apparatus and method for removing sulfur dioxide from hot flue gases. The apparatus has a horizontally disposed housing through which the hot flue gases are passed, and at least one liquid injection manifold vertically disposed therein and extending to adjacent a lower wall of the housing for directing an aqueous scrubbing medium parallel to the gas flow, and a flow deflection member adjacent to, and downstream from, the manifold. Aqueous scrubbing medium is collected in reservoirs at the lower wall of the housing and recycled to the injection manifolds. The method provides for injection of aqueous scrubbing medium parallel to the flue gas flow and deflection of the gases, following the injection, by use of packing or baffles to provide intimate contact of the scrubbing medium with the gaseous stream.

6 Claims, 2 Drawing Sheets

HORIZONTAL WET SCRUBBING APPARATUS AND METHOD FOR REMOVING SULFUR DIOXIDE FROM A GASEOUS STREAM

FIELD OF THE INVENTION

The present invention relates to an apparatus useful for removing sulfur dioxide from flue gas streams and to a method for removal of sulfur dioxide from gaseous streams using a wet scrubbing process in a horizontal scrubbing unit.

BACKGROUND OF THE INVENTION

With the continuous increase of environmental controls over the discharge of certain gases, such as sulfur dioxide, into the atmosphere, the development of more efficient and economical means for removing such gases from flue gases has steadily continued. Especially in coal burning power plant systems for production of electricity, restrictions are applicable which require an ever increasing efficiency in removal of sulfur dioxide from flue gases.

Sulfur dioxide removal systems are generally characterized as (a) dry scrubbing systems, where a solution or slurry of a reagent is dispersed in hot flue gases, with the water content thereof evaporated, and collection of relatively dry by-products made for disposal, or (b) wet scrubbing systems, were an aqueous solution or slurry of a reagent, such as an alkali or alkaline earth reagent is contacted with the gases, with collection and disposal of wet sludges.

Dry scrubbing systems are generally classified into two categories. One is the dry sprayer or vertical reactor where the sorbent is dispersed into a flow of sulfur dioxide-containing flue gases, with optional removal of fly ash prior to the contact. The other is the dry sorbent injection method where a sorbent, with possible accelerators, is injected into a horizontal ductwork through which the gases are passed with dry solid reactants and excess sorbent removed from the gas prior to discharge to the atmosphere. The vertical reactor type dry system is suited primarily for use with lower sulfur dioxide content gases and provides reasonable percentage removals, while the dry sorbent injection type dry system generally gives lower percentages of sulfur dioxide removal from the gases.

Wet scrubbing systems have also evolved into two main categories, those using a vertical tower and those using a horizontal contactor. In the vertical tower scrubbing systems, gas is normally charged to the tower at a lower portion thereof and passes upwardly through the tower in contact with a countercurrently flowing dispersed aqueous scrubbing solution or slurry. Spaced contact trays may be provided in the tower to achieve better contact of the scrubbing medium and the gas, while a demister or liquid removal device is provided near the top of the vertical scrubber to remove liquid from the gas stream prior to discharge of the cleansed gas stream to the atmosphere. Difficulties inherent in the use of such vertical scrubbers include inadequate or sporadic contact of the gaseous stream with the descending aqueous scrubbing media, an increased pressure drop within the scrubbing unit as the gases flow therethrough, and the need to assure that all liquid is removed from the gases prior to discharge from the upper region of the vertical scrubber. In order to assure such complete removal of liquid, prior to discharge of the gas, the volume and rate of flow of the gases through the scrubber is limited.

In order to avoid problems associated with vertical scrubbers, horizontal contactors or scrubbers have been developed. As an example of such horizontal scrubbers, reference may be made to U.S. Pat. No. 3,948,608 to Weir, the contents of said patent incorporated by reference herein. In U.S. Pat. No. 3,948,608, an apparatus for wet scrubbing of gases is described which uses an elongated chamber defining a substantially horizontally extending flow path for gases to be cleaned having a substantially unrestricted cross-sectional flow area along its length so as to avoid any pressure drop between an inlet to the chamber and an outlet from the chamber. Liquid reagent sprayers are provided that spray reagent across the chamber substantially perpendicular to the flow path of the gases to remove sulfur dioxide from the gases by the spray droplets, and spent reagent is collected and discharged from the bottom of the chamber. The collected spent reagent is collected in a tank as a liquid slurry. Improvements on this original system are described in subsequent patents to Weir, such as U.S. Pat. Nos. 4,102,982 and 4,369,167, while a further improvement in the process is described in U.S. Pat. No. 4,269,812 to Edwards and Huang. Such prior art horizontal scrubbers have been limited by the gas velocity that can be accommodated while providing a high removal of sulfur dioxide. At the present time, all known flue gas desulfurization wet scrubbing systems being offered commercially are of the vertical tower type due to the limitations associated with horizontal scrubbers.

It is an object of the present invention to provide a horizontal scrubber and method for removal of sulfur dioxide from flue gases which provides removal of at least ninety percent of the sulfur dioxide while providing a high flue gas velocity through the scrubber.

SUMMARY OF THE INVENTION

The present invention provides a horizontal wet scrubbing apparatus and method for removing sulfur dioxide from a gaseous stream including a horizontally disposed housing of a first cross-sectional area having a gas inlet, of a second cross-sectional area less than that of the housing, and a gas outlet. At least one liquid injection manifold is vertically disposed in a gas-liquid contact section of the horizontally disposed housing, which extends from an upper wall of the housing to a location adjacent a lower wall of the housing, the manifold having a plurality of liquid injection nozzles for directing an aqueous scrubbing medium in a direction parallel to the flow of a gaseous stream through the housing. At least one flow deflection member, such as packing or a chevron-type baffle, extends completely across the gas-liquid contact section of the housing at a location adjacent to, and downstream from the liquid injection manifold. A conduit charges an aqueous medium containing a scrubbing compound through the manifold and outwardly from the nozzles and a collector collects liquid at the lower wall of the housing and discharges the same therefrom. The inlet feeds the gas into the housing for flow therethrough and a liquid removal device is provided adjacent an outlet from the housing to remove liquid from the gases prior to discharge.

According to the present method, sulfur dioxide is removed from a hot gaseous stream by passing the gaseous stream through a horizontally disposed housing of a first cross-sectional area from an inlet having a lesser cross-sectional area, with an aqueous scrubbing medium injected into the gaseous stream in a direction parallel to the flow of the gases to provide a supply of such aqueous medium substantially across the cross-sectional area of the horizontally disposed housing. The flow of the gaseous stream is deflected following such injection to provide intimate contact of the scrubbing medium and the gaseous stream. Aqueous medium is removed from the gases following the deflection of flow of the gases and the gases then discharged from the horizontally disposed housing.

BRIEF DESCRIPTION OF THE DRAWINGS

The present invention will be better understood when considered in view of the following detailed description of embodiments thereof taken in conjunction with the accompanying drawings, wherein.

DETAILED DESCRIPTION

The present invention provides an apparatus for the removal of sulfur dioxide from a gaseous stream that comprises a horizontally disposed housing for gas-liquid contact, and a process for removing sulfur dioxide from flue gases using a horizontally disposed housing.

Figure 1:
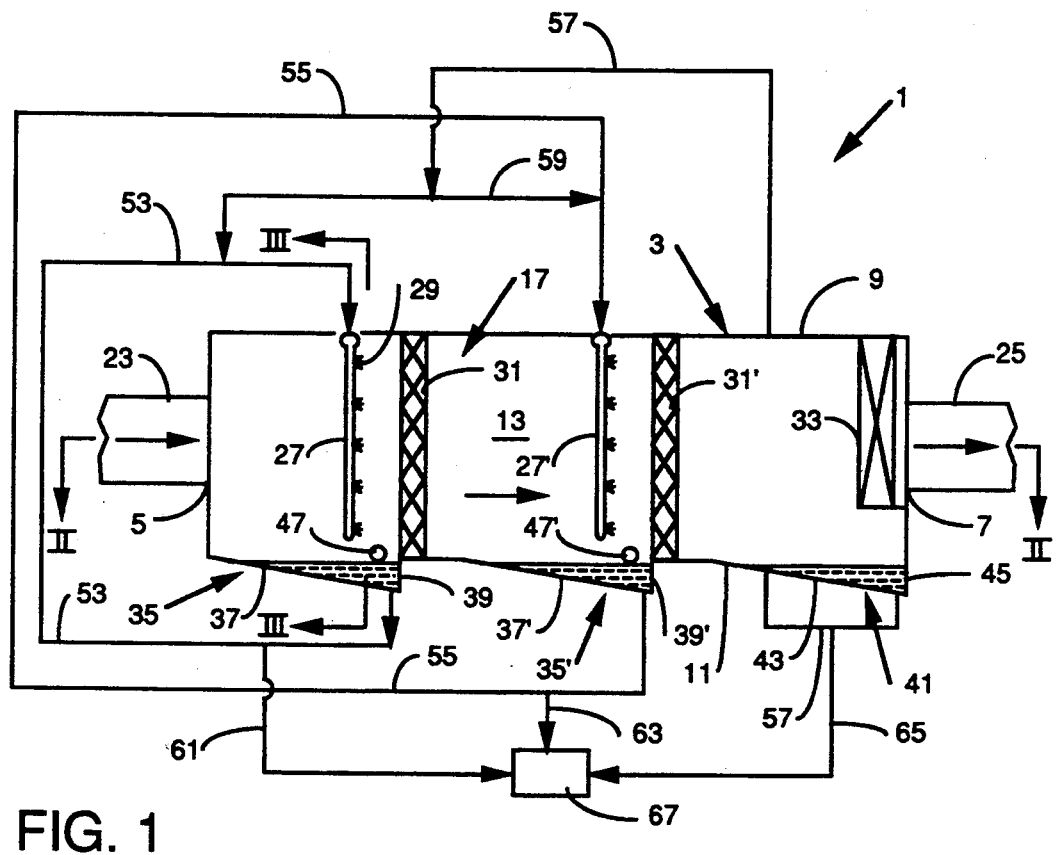
FIG. 1 is a cross-sectional schematic view of the apparatus of the present invention.
Figure 2:
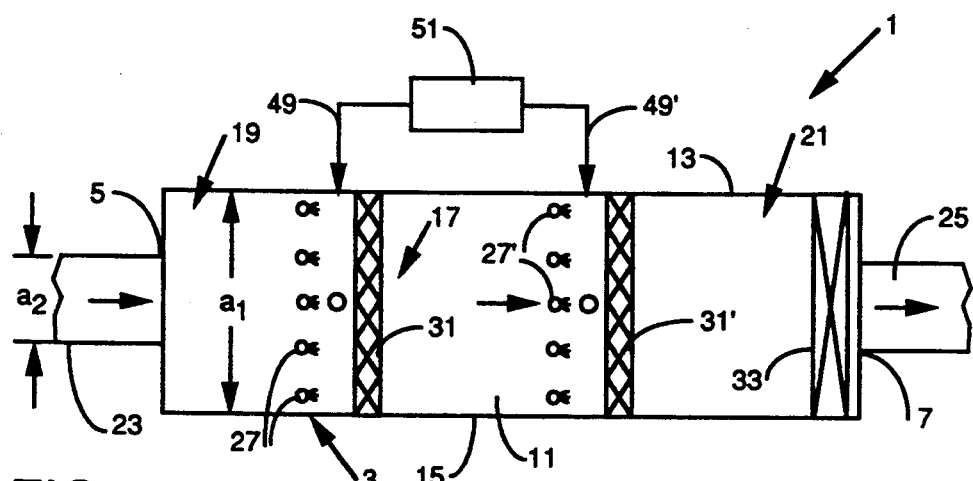
FIG. 2 is a view taken along lines II—II of FIG. 1.
Figure 3:
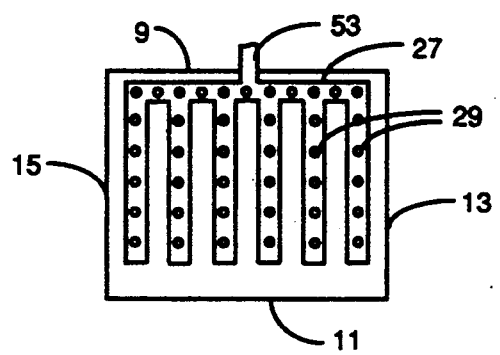
FIG. 3 is a view taken along lines III—III of FIG. 1.

Referring now to FIGS. 1 and 2, a preferred embodiment of the horizontal wet scrubbing apparatus 1 for the removal of sulfur dioxide from a gaseous stream is illustrated, having a horizontally disposed housing 3, a gas inlet 5 and a gas outlet 7. The horizontally disposed housing 3 is preferably formed as a rectangular housing having an upper wall 9, lower wall 11 and opposed side walls 13 and 15. A gas-liquid contacting section 17 of the horizontally disposed housing 3 has an upstream section 19 into which a hot gaseous stream containing sulfur dioxide is introduced through gas inlet 5, and a downstream section 21 from which scrubbed gases are discharged through gas outlet 7, as indicated by the arrows in FIGS. 1 and 2. A hot gaseous stream containing sulfur dioxide is fed from an inlet duct 23 through the gas inlet 5, the gas inlet 5 having a second cross-sectional area a2 which is less than a first cross-sectional area a1 of the horizontally disposed housing 3. The gases discharged through gas outlet 7 are fed through an outlet duct 25, which is preferably of a cross-sectional area less than the cross-section area a1 of the horizontal disposed housing 3.

Provided in the horizontally disposed housing 3 is at least one, and preferably a plurality of vertically disposed spaced liquid injection manifolds 27, 27' with each manifold having a plurality of liquid injection nozzles 29. The liquid injection manifolds 27, 27' are spaced from each other along the gas-liquid contact section 17 of the horizontally disposed housing 3 and extend from the upper wall 9 to adjacent the lower wall 11 thereof. The liquid injection nozzles 29 are arranged so as to direct an aqueous medium in a direction parallel to the flow of a gaseous stream through the horizontally disposed housing 3, to provide a supply of said aqueous medium substantially across the first cross-sectional area a1 of the housing.

Extending completely across the gas-liquid contact section 17 of the horizontally disposed housing, adjacent to and downstream from the liquid injection manifold 27, 27', is a flow deflection member 31, 31' which is disposed to impede the flow of gases through the gas-liquid contact section, such as by altering the direction of flow of the gas, which causes an increase in the pressure drop between gases entering the gas inlet 5 and the leaving gas outlet 7 of the horizontally disposed housing 3, and provides additional gas-liquid contact between a liquid scrubbing medium discharged through the liquid injection nozzles 29 and the gaseous stream passing through the horizontally disposed housing 3. The flow deflection members 31, 31', which may be a supply of plastic packing such as PN Fill, sold by Munters Corp. or B-GON sold by, KIMRE, Inc., or a chevron-type baffle unit, extend completely across the cross-sectional area a1 of the horizontally disposed housing so as to alter the flow of gases therethrough and prevent any by-passing of the flow deflection member 31, 31' by the gases. Also extending across said horizontally disposed housing 3, adjacent the gas outlet 7 is a means for removing liquid, such as a demisting device 33, to remove water droplets from the gaseous stream passing through the horizontally disposed housing 3 prior to discharge of the gas through the gas outlet 7 into outlet duct 25.

A preferred means for collecting the aqueous scrubbing medium at the lower wall 11 of horizontally disposed housing 3 is to provide a reservoir 35, immediately preceding a flow deflector member 31 in the lower wall 11, such as by providing a downwardly inclined portion 37 in the bottom wall 11 at least between the liquid injection manifold 27 and the flow deflection member 31, with an upwardly extending closure wall 39 extending to the location of the flow deflection member 31, as illustrated. Such an arrangement allows collection of the aqueous scrubbing medium while preventing any by-passing of the flow deflection member by gases passing through the horizontally disposed housing 3. With a further liquid injection manifold 27' and further flow deflection member 31' present, a further reservoir 35' is provided, with downwardly inclined portion 37' and upwardly extending closure wall 39'. A final reservoir 41 is also provided adjacent the demisting device 33, also preferably having a downwardly inclined bottom wall 43 and upwardly extending closure wall 45 which collects aqueous medium removed from the gases in the demisting device 33 and prevents by-pass of gases below the demisting device 33.

Fresh aqueous scrubbing medium is charged to the horizontally disposed housing 3 through charging inlets 47, 47' in the sidewall 13 of the housing 3 into the reservoir 35, 35' through lines 49, 49' respectively from a source 51 of aqueous scrubbing medium. The aqueous scrubbing medium collected in reservoir 35 is recycled through line 53 to a liquid injection manifold, such as manifold 27, and aqueous scrubbing medium collected in reservoir 35' is recycled through line 55 to a liquid rejection manifold, such as manifold 27', while liquid from the demisting device 33, collected in reservoir 41 is recycled through line 57 to line 59 and may be returned to either liquid injection manifold 27 or 27' as desired. From each of the recycle lines 53, 55 and 57, an off-take or bleed stream may be removed through lines 61, 63 and 65, respectively, which is passed to a solids removal or treatment unit 67.

Figure 4:
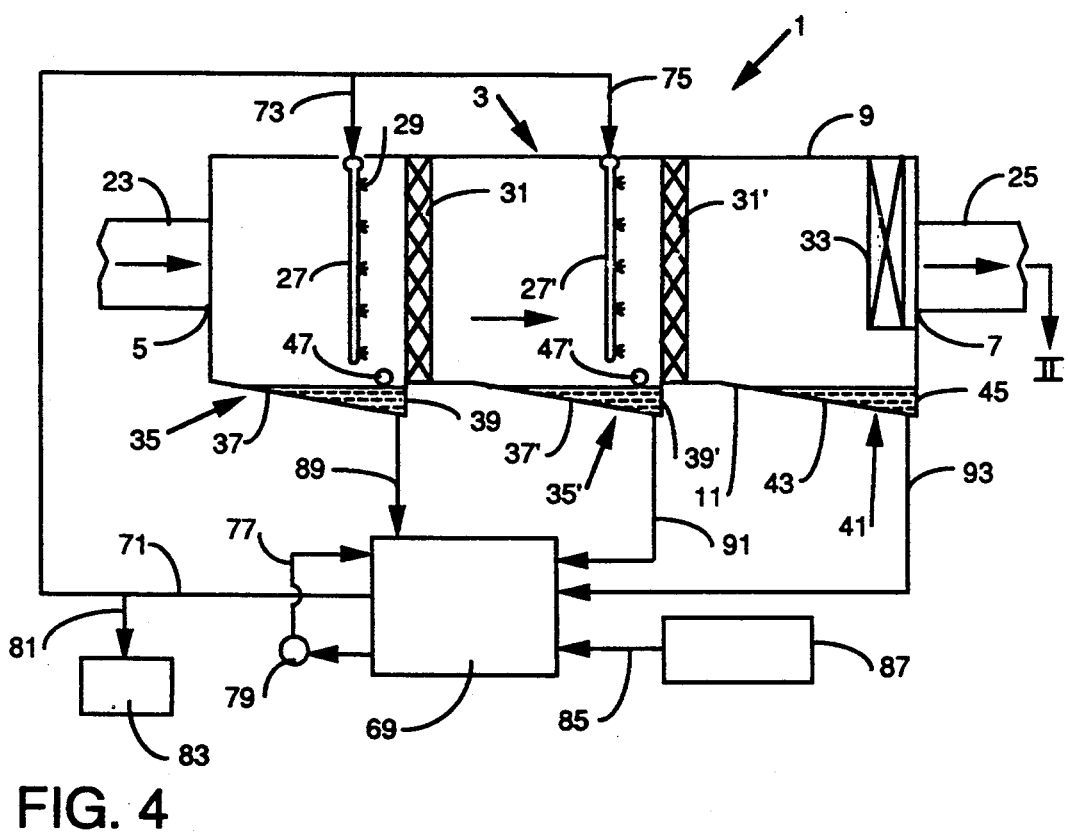
FIG. 4 is a cross-sectional schematic view of another embodiment of the apparatus of the present invention.

In the embodiment illustrated in FIG. 4, which is similar to FIG. 1 with like numerals identifying like components, a hold tank 69 is provided in addition to the reservoirs 35, 35' and 41 to provide additional hold time for reactants. As shown in FIG. 4, the hold tank 69 provides aqueous medium through line 71 to conduits 73 and 75 for feeding to liquid injector manifolds 27 and 27' respectively. A recirculation line 77 and pump 79 are provided at the hold tank 69 to recirculate aqueous medium contained therein. A bleed stream from line 71 may be taken through line 81 to a further tank 83 where a build-up of solids may be removed from the system. Fresh make-up aqueous scrubbing medium is provided to the hold tank 69 through line 85 from a source 87. After contact with the hot $SO_2$-containing gases, the aqueous scrubbing medium is collected at the lower wall 11 of the horizontally disposed housing 3 in reservoirs 35, 35' and 41, and then returned to the hold tank 69 by means of discharge lines 89, 91 and 93 respectively.

The present method and apparatus are adapted for removal of sulfur dioxide from hot flue gases where the sulfur dioxide is present in an amount of about 500–5000 parts per million (ppm) in the flue gas, and where removal of at least about 90 percent of the sulfur dioxide is effected.

Typically, flue gas from fossil fuel combusters in power plants will be provided at a velocity of about 40–60 feet per second. The gases will normally have solid particulates, such as fly ash, removed therefrom by use of an electrostatic precipitator or a bag house. These hot flue gases, at a temperature of between about 250°–350° F., are fed, according to the present method, through the inlet 5 to the horizontally disposed housing 3. In the horizontally disposed housing 3, the flow of gases expands and, by contact with the cooler injected aqueous scrubbing medium, the gases are cooled to a temperature of between about 120°–130° F., with a resultant decrease in the velocity of the flow of gases to about 20–30 feet per second. The pressure differential of gases passing through the horizontally disposed housing will typically be less than about 10 inches of water. To achieve such conditions in the horizontal wet scrubbing apparatus, and a 90 percent removal of sulfur dioxide from the gaseous stream, the amount of aqueous scrubbing medium recycled and injected in the gaseous stream, parallel to the flow thereof, will be between about 20–60 gallons per 1000 actual cubic feet per minute (ACFM) of gases, with a maximum of about 5 percent suspended solids contained in the aqueous scrubbing medium. Also, the residence time of collected aqueous medium at the lower wall 11 should be maintained at less than about 10 minutes, and preferably less than about 3 minutes. The residence time will be sufficient to dissolve either the magnesium sulfite or magnesium hydroxide used in the aqueous scrubbing medium. If the reservoirs 35, 35' and 41 are insufficient in size to provide the residence time the embodiment of FIG. 4 should be used with provision of hold tank 69. The need for such a hold tank will be dependent upon a number of factors, including such factors as the amount of aqueous scrubbing medium being recycled, the predominant alkaline species (magnesium sulfite on magnesium hydroxide), the time required to dissolve the alkaline species, and the amount of sulfur dioxide in the hot gaseous stream. With the use of magnesium sulfite, for example, a residence time of one minute or less may suffice, while with the use of magnesium hydroxide, a residence time of between about 3–10 minutes may be used.

In the present method, the aqueous scrubbing medium may be an aqueous lime slurry that contains an effective amount of magnesium ions to form magnesium sulfite by reaction with the sulfur dioxide in the gas, such as described in U.S. Pat. Nos. 3,919,393 and 3,919,394 the contents of both said patents incorporated by reference herein. Or, the scrubbing medium may be an aqueous suspension of magnesium hydroxide which forms magnesium sulfite by reaction with the sulfur dioxide in the gas, such as described in U.S. Pat. Nos. 4,996,032 or U.S. Pat. No. 5,039,499, the contents of both said patents incorporated by reference herein. The aqueous scrubbing medium is recycled through the horizontal scrubbing unit through which the gas is passed, and a bleed stream of scrubbing medium removed therefrom which is treated to remove sulfites and sulfates formed during the reaction of the gas with the components of the scrubbing medium, with clarified liquor returned to the horizontal scrubbing unit.

The aqueous scrubbing medium should contain at least about 3000 parts per million (ppm) of effective magnesium ions. As known in the art, the effective amount of magnesium ion in such scrubbing media is that amount over and above the chloride ion content of the aqueous media present in the scrubbing unit. Since chloride ions tend to interfere with the effect of the magnesium ions present in the scrubbing solution, only those magnesium ions over and above that required to form magnesium chloride in the scrubbing unit are considered to be "effective" in the removal of sulfur dioxide from the flue gas. For example, the effective magnesium [Mg (eff)], as parts per million (ppm) may be obtained by use of the equation:

$$Mg(eff) = Mg(total) - [Cl^-/2.92]$$

Also, the pH of the scrubbing medium at introduction to the horizontally disposed housing should be between 5.5 to 7.5.

During wet scrubbing of hot flue gases, oxygen will be present that generally oxidizes sulfites of magnesium to magnesium sulfate, which sulfate is ineffective in removal of sulfur dioxide from gases. It would generally be expected, therefore, that removal of sulfite-rich liquors from a scrubbing unit as quickly as possible would result in less oxidation taking place. It has, however, been found that the use of a flow deflection member as provided in the present process, which causes a longer retention time of the scrubbing solution in the horizontally disposed housing actually results in a lower amount of oxidation than when such flow deflection members are not present. For example, as illustrated in Table I, a horizontally disposed housing was used to remove sulfur dioxide from flue gases, where Runs 1–15 used two spaced injection nozzles followed by two spaced flow deflection members, one following each of the injection nozzles, while Runs 16–26 used two spaced injection nozzles with no flow deflection members present.

TABLE I

| RUN # | INLET SO2 (ppm) | MEAN % SO2 Removal | FINAL CHEMISTRY Mg++ | SO3-- | SO4-- | PERCENT OXIDATION | pH | FGV[1] | L/G[2] |
| --- | --- | --- | --- | --- | --- | --- | --- | --- | --- |
| 1 | 1797.0 | 70.1 | 1941 | 3919 | 3132 | 39.98 | 7.2 | 19.0 | 41.4 |
| 2 | 1825.5 | 82.6 | 5215 | 8210 | 10850 | 52.41 | 7.8 | 19.1 | 41.3 |
| 3 | 1809.7 | 81.8 | 5500 | 7813 | 12590 | 57.32 | 7.3 | 19.1 | 41.1 |
| 4 | 1686.0 | 71.4 | 4227 | 5524 | 10305 | 60.86 | 7.2 | 18.8 | 41.8 |
| 5 | N/R | N/R | N/R | N/R | N/R | N/R | 6.8 | 18.9 | 41.6 |
| 6 | 1763.0 | 77.3 | 4337 | 5027 | 11193 | 64.98 | 7.6 | 18.9 | 41.6 |
| 7a | 1734.5 | 73.2 | 3550 | 4483 | 9516 | 63.89 | 6.4 | 19.1 | 41.2 |
| 7b | 1734.5 | 73.2 | 3550 | 4483 | 9516 | 63.89 | 6.4 | 19.1 | 41.2 |
| 8a | 1800.5 | 81.3 | 4196 | 3987 | 11962 | 71.43 | 7.2 | 19.1 | 41.2 |
| 8b | 1800.5 | 81.3 | 4196 | 3987 | 11962 | 71.43 | 7.2 | 19.1 | 41.2 |
| 9 | 1907.9 | 76.8 | 4994 | 5123 | 14391 | 70.07 | 6.5 | 19.4 | 40.7 |
| 10a | 1277.1 | 77.0 | 5708 | 5276 | 17052 | 72.92 | 6.5 | 25.3 | 31.1 |
| 10b | 1277.1 | 77.0 | 5708 | 5276 | 17052 | 72.92 | 6.5 | 30.5 | 25.8 |
| 11 | 1983.8 | 81.9 | 5160 | 4760 | 15962 | 72.37 | 7.0 | 19.2 | 40.9 |
| 12a | 1310.2 | 79.7 | 5680 | 4760 | 17017 | 74.87 | 7.0 | 25.3 | 31.1 |
| 12b | 1310.2 | 79.7 | 5680 | 4760 | 17017 | 74.87 | 7.0 | 30.7 | 25.6 |
| 13 | 1806.9 | 81.7 | 5900 | 5172 | 17228 | 37.52 | 7.5 | 19.1 | 41.2 |
| 14 | 1534.1 | 80.5 | 4945 | 5860 | 12646 | 64.26 | 7.5 | 25.2 | 31.2 |
| 15 | 1276.3 | 82.4 | 5368 | 6100 | 14035 | 65.72 | 7.5 | 30.3 | 26.0 |
| 16 | 1794.9 | 70.5 | 4314 | 4011 | 12863 | 72.77 | 6.5 | 19.2 | 41.1 |
| 17 | 1507.8 | 57.6 | 2939 | 2770 | 8724 | 72.41 | 6.5 | 25.2 | 31.2 |
| 18 | 1280.8 | 52.4 | 5140 | 2041 | 18179 | 88.13 | 6.5 | 30.5 | 25.8 |
| 19 | 1582.3 | 63.8 | 6238 | 3530 | 20965 | 83.19 | 6.5 | 25.6 | 30.8 |
| 20 | 2186.9 | 59.9 | 6287 | 4716 | 19923 | 77.88 | 6.5 | 25.2 | 31.2 |
| 21 | 3026.3 | 59.5 | 6442 | 6580 | 18593 | 70.19 | 6.5 | 25.5 | 30.8 |
| 22 | 3010.9 | 63.9 | 6900 | 8350 | 18558 | 64.94 | 6.5 | 25.6 | 30.7 |
| 23 | 2139.5 | 57.6 | 5860 | 5580 | 17336 | 72.14 | 6.5 | 30.2 | 26.0 |
| 24 | 1561.5 | 68.3 | 6627 | 5060 | 20908 | 77.49 | 6.5 | 25.2 | 31.2 |
| 25 | 1800.7 | 68.1 | 6131 | 3122 | 20968 | 84.84 | 6.5 | 19.2 | 41.1 |
| 26 | 1837.2 | 66.7 | 6802 | 3379 | 23351 | 85.20 | 6.5 | 19.2 | 40.9 |

1 = flue gas velocity (feet/sec.)
2 = liquid:gas ratio (gallon liquor/100 ACFM flue gas)
N/R: not recorded As seen by comparing runs 1–15 with runs 16–26, the presence of the flow deflection members, while providing a longer retention time for the aqueous scrubbing medium in the horizontally disposed scrubber, generally resulted in an increased SO2 removal as well as a lower percentage of oxidation of sulfites to sulfates at comparable inlet SO2 ppm values.

Also, it would generally be expected that contact of a scrubbing medium with a higher flow rate of the sulfur dioxide-containing flue gases through a horizontally disposed housing would result in a lower removal of sulfur dioxide therefrom. It has been found, however, that an increase in flue gas velocity (FGV) through the present horizontal scrubber with injection nozzles results in no appreciable decrease in the percent removal of SO2 from the flue gas where flow deflection members are provided. For example: comparing Runs 9, 10a and 10b shows that although the FGV was raised from 19.4 to 25.3 then to 30.5, the SO2 removal remained virtually constant at 76.8, 77.0 and 77.0 percent; comparing Runs 11, 12a and 12b shows that although the FGV was raised from 19.2 to 25.3 than to 30.7, the SO2 removal remained virtually constant at 81.9, 79.9 and 79.7 percent; and comparing Runs 13, 14 and 15 shows that although the FGV was raised from 19.1 to 25.2 and then to 30.3, the SO2 removal remained virtually constant at 81.7, 80.5 and 82.4 percent. By contrast, without the flow deflection members being present, comparison of Runs 16, 17 and 18 show that increasing the FGV from 19.2 to 25.2 and then to 30.5 decreased the SO2 removal from 70.5, to 57.6 and to 52.4 respectively.

It should be noted that the test results of Table I were obtained from a pilot scrubber which was only 8"×8" by 10 feet in size which resulted in considerable wall wetting and wall effects which contribute to a lower SO2 removal of less than about 90 percent. From previous experience, however, removals of at least 90% of the SO2, and up to 99% of the SO2, would be expected in a full scale horizontal scrubbing unit used in conjunction with a typical power plant combustion off-gas stream.

A general comparison of the advantages of the present method with typical existing wet and dry scrubbing processes is given in TABLE II.

TABLE II

| | Sulfur Content of Coal Combusted (%) | Stoichiometry Required | Flue Gas Velocity Range (ft/sec) | SO2 Removal (%) |
| --- | --- | --- | --- | --- |
| WET SCRUBBING | | | | |
| Vertical Tower | 1–5 | 1.03–1.05 | 8–10 | 80–99 |
| Horizontal Contactor | 1–5 | 1.05–1.15 | 15–20 | 80–90 |
| DRY SCRUBBING | | | | |
| Vertical Spray | <2.5 | 1.1–1.31 | 4–7 | 70–90 |
| Dry Sorbent Injection | 1–5 | 1.5–2.5 | 40–50 | 50–60 |
| Present Method | 1–5 | 1.03–1.05 | 20–30 | 90–99 |

As can be seen when compared to existing wet and dry sulfur dioxide scrubbing processes, the present process is usable with flue gases from coal containing a wide range of sulfur contents (1–5%), is operable at low stoichiometry with respect to sorbent-to-sulfur dioxide (1.03–1.05), can be used with moderately high flue gas velocities (20–30 feet/second) and still results in a higher sulfur dioxide removal (90–99%). The present process thus provides the best attributes of prior scrubbing process into a single system for removing sulfur dioxide from hot flue gases.

What is claimed is:

1. A method of removing sulfur dioxide from a hot gaseous stream, containing solid particulates, by contact with an aqueous scrubbing medium containing a scrubbing compound selected from magnesium sulfite and magnesium hydroxide, comprising:

removing solid particulates from said hot gaseous stream;

passing said gaseous stream into a horizontally disposed scrubbing housing, having a first cross-sectional area, from an inlet having a second cross-sectional area less than said first cross-sectional area at a velocity of about 40–60 feet per second, wherein said gaseous stream expands;

passing said gaseous stream through said horizontally disposed scrubbing housing while injecting said aqueous scrubbing medium into said gaseous stream in a direction parallel to the flow thereof, at a plurality of locations along said horizontally disposed scrubber housing, to provide a supply of said aqueous scrubbing medium substantially across said first cross sectional area of said scrubbing housing to provide gas-liquid contact so as to effect reaction between said scrubbing compound and said sulfur dioxide and produce magnesium sulfites prior to contact thereof with said flow deflection member;

deflecting the flow of said gaseous stream by passage through a flow deflection member selected from the group consisting of packing or chevron baffles downstream from and at a location closely adjacent said injection of aqueous medium to provide intimate contact of said aqueous scrubbing medium and said gaseous stream, with a resultant significantly less degree of oxidation of said magnesium sulfites to magnesium sulfate than would result in the absence of said flow deflection member;

removing aqueous medium from said gaseous stream following said deflection of flow thereof; and discharging said gaseous stream at a velocity of about 20–30 feet per second from said horizontally disposed scrubbing housing.

2. A method of removing sulfur dioxide from a hot gaseous stream by contact with an aqueous scrubbing medium as defined in claim 1 wherein said hot gaseous stream is at a temperature of about 250°–350° F. upon passage into said horizontally disposed scrubbing housing and is cooled in said housing to a temperature of between about 120°–130° F. by said injected aqueous scrubbing medium prior to discharge from said housing.

3. A method of removing sulfur dioxide from a hot gaseous stream by contact with an aqueous scrubbing medium as defined in claim 1 wherein said hot gaseous stream contains sulfur dioxide in an amount of about 500–5000 parts per million upon introduction to said horizontally disposed housing and wherein at least about 90 percent of said sulfur dioxide is removed in said housing prior to discharge of said gas therefrom.

4. A method of removing sulfur dioxide from a hot gaseous stream by contact with an aqueous scrubbing medium as defined in claim 1 wherein said aqueous scrubbing medium contains magnesium sulfite.

5. A method of removing sulfur dioxide from a hot gaseous stream by contact with an aqueous scrubbing medium as defined in claim 1 wherein said aqueous scrubbing medium contains magnesium hydroxide.

6. A method of removing sulfur dioxide from a hot gaseous stream by contact with an aqueous scrubbing medium as defined in claim 1 wherein said aqueous scrubbing medium is injected into said gaseous stream at a plurality of locations along said horizontally disposed scrubbing housing and the flow of said gaseous stream is deflected at a location closely adjacent each said injection.

* * * * *